US008892439B2

(12) United States Patent
Odell et al.

(10) Patent No.: US 8,892,439 B2
(45) Date of Patent: Nov. 18, 2014

(54) COMBINATION AND FEDERATION OF LOCAL AND REMOTE SPEECH RECOGNITION

(75) Inventors: Julian J. Odell, Redmond, WA (US); Robert L. Chambers, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1158 days.

(21) Appl. No.: 12/503,191

(22) Filed: Jul. 15, 2009

(65) Prior Publication Data
US 2011/0015928 A1 Jan. 20, 2011

(51) Int. Cl.
G10L 15/18 (2013.01)
G10L 15/30 (2013.01)

(52) U.S. Cl.
CPC ....................... *G10L 15/30* (2013.01)
USPC ............ 704/257; 704/270.1; 704/275; 704/9; 704/251

(58) Field of Classification Search
CPC ....... G10L 15/30; G10L 15/32; G10L 15/065; G10L 15/06; G10L 15/187; G10L 2015/0635; G06Q 10/067; G06K 9/6262; G06K 8/00281; G04L 29/06027; G04M 3/4938
USPC ................. 704/257, 275, 270, 251, 231, 201, 704/270.1, 244, 243, 9
See application file for complete search history.

(56) References Cited

U.S. PATENT DOCUMENTS

| 5,864,815 | A * | 1/1999 | Rozak et al. ............ 704/275 |
| 6,434,524 | B1 | 8/2002 | Weber |
| 6,801,604 | B2 | 10/2004 | Maes et al. |
| 6,868,385 | B1 | 3/2005 | Gerson |
| 6,996,525 | B2 | 2/2006 | Bennett et al. |
| 7,028,271 | B2 * | 4/2006 | Matsugu et al. ........ 716/107 |
| 7,260,535 | B2 | 8/2007 | Galanes et al. |
| 7,340,395 | B2 | 3/2008 | Gurram et al. |
| 7,418,090 | B2 | 8/2008 | Reding et al. |
| 8,195,467 | B2 * | 6/2012 | Mozer et al. ............ 704/275 |
| 8,332,227 | B2 * | 12/2012 | Maes et al. ............ 704/270.1 |

(Continued)

FOREIGN PATENT DOCUMENTS

WO   WO 2008109835 A2 *  9/2008

OTHER PUBLICATIONS

"Revolutionizing Voice UI for Mobile", Retrieved at<<http://www.vlingo.com/pdf/Vlingo%20Voice%20Recognition%20White%20Paper%20-%20May%202008v2.pdf>>, May 2008, pp. 1-7.

(Continued)

*Primary Examiner* — Vijay B Chawan
(74) *Attorney, Agent, or Firm* — Steven Spellman; Peter Taylor; Micky Minhas

(57) ABSTRACT

Techniques to provide automatic speech recognition at a local device are described. An apparatus may include an audio input to receive audio data indicating a task. The apparatus may further include a local recognizer component to receive the audio data, to pass the audio data to a remote recognizer while receiving the audio data, and to recognize speech from the audio data. The apparatus may further include a federation component operative to receive one or more recognition results from the local recognizer and/or the remote recognizer, and to federate a plurality of recognition results to produce a most likely result. The apparatus may further include an application to perform the task indicated by the most likely result. Other embodiments are described and claimed.

18 Claims, 4 Drawing Sheets

(56) References Cited

U.S. PATENT DOCUMENTS

| | | | |
|---|---|---|---|
| 8,422,994 B2* | 4/2013 | Rhoads et al. | 455/411 |
| 2003/0061036 A1* | 3/2003 | Garudadri et al. | 704/208 |
| 2004/0103095 A1* | 5/2004 | Matsugu et al. | 707/6 |
| 2006/0041431 A1* | 2/2006 | Maes | 704/270.1 |
| 2006/0190268 A1* | 8/2006 | Wang | 704/275 |
| 2006/0195323 A1* | 8/2006 | Monne et al. | 704/270.1 |
| 2007/0038436 A1* | 2/2007 | Cristo et al. | 704/9 |
| 2007/0203708 A1* | 8/2007 | Polcyn et al. | 704/270.1 |
| 2007/0233487 A1* | 10/2007 | Cohen et al. | 704/255 |
| 2008/0027723 A1* | 1/2008 | Reding et al. | 704/231 |
| 2008/0069437 A1* | 3/2008 | Baker | 382/159 |
| 2008/0071544 A1 | 3/2008 | Beaufays et al. | |
| 2008/0091406 A1* | 4/2008 | Baldwin et al. | 704/4 |
| 2008/0154870 A1* | 6/2008 | Evermann et al. | 707/4 |
| 2008/0288252 A1* | 11/2008 | Cerra et al. | 704/244 |
| 2008/0312934 A1* | 12/2008 | Cerra et al. | 704/275 |
| 2009/0030687 A1* | 1/2009 | Cerra et al. | 704/243 |
| 2009/0030691 A1* | 1/2009 | Cerra et al. | 704/255 |
| 2009/0030697 A1* | 1/2009 | Cerra et al. | 704/275 |
| 2009/0204409 A1* | 8/2009 | Mozer et al. | 704/275 |
| 2009/0204410 A1* | 8/2009 | Mozer et al. | 704/275 |
| 2009/0287477 A1* | 11/2009 | Maes et al. | 704/201 |
| 2010/0106497 A1* | 4/2010 | Phillips | 704/231 |
| 2012/0069131 A1* | 3/2012 | Abelow | 348/14.01 |

OTHER PUBLICATIONS

Frost, et al."A Browser for a Public-Domain SpeechWeb", Retrieved at<<http://www2007.org/posters/poster927.pdf>>, WWW 2007 / Poster Paper, WWW 2007, May 8-12, 2007, Banff, Alberta, Canada, pp. 1307-1308.

* cited by examiner

COMBINATION AND FEDERATION OF LOCAL AND REMOTE SPEECH RECOGNITION

BACKGROUND

Automatic speech recognition (ASR) may provide an operator with the ability to use a device without needing to use the operator's hands. This allows the operator to speak to, for instance, a cell phone, a portable computing device, or other device and achieve the same functionality as if the operator were typing or otherwise manually inputting commands. More and more applications may work with ASR, and the accompanying grammars may increase in size and complexity. The applications may need access to large amounts of data in order to complete their function. Mobile devices often have limited storage, and may access data over a network.

It is with respect to these considerations and others that the present improvements have been made.

SUMMARY

Various embodiments may be generally directed to federating local and remote speech recognition results. Some embodiments may be particularly directed to techniques to improve efficiency and expand the use of speech recognition on local devices such as mobile phones and portable computing devices.

In one embodiment, an apparatus may include an audio input to receive audio data. The apparatus may further include a local recognizer component to receive the audio data indicating a task, to pass the audio data to a remote recognizer while receiving the audio data, and to recognize speech from the audio data. The apparatus may further include a federation component operative to receive one or more recognition results from the local recognizer and/or the remote recognizer, and to select from a plurality of recognition results to produce a most likely result. The apparatus may further include an application to perform the task indicated by the most likely result. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
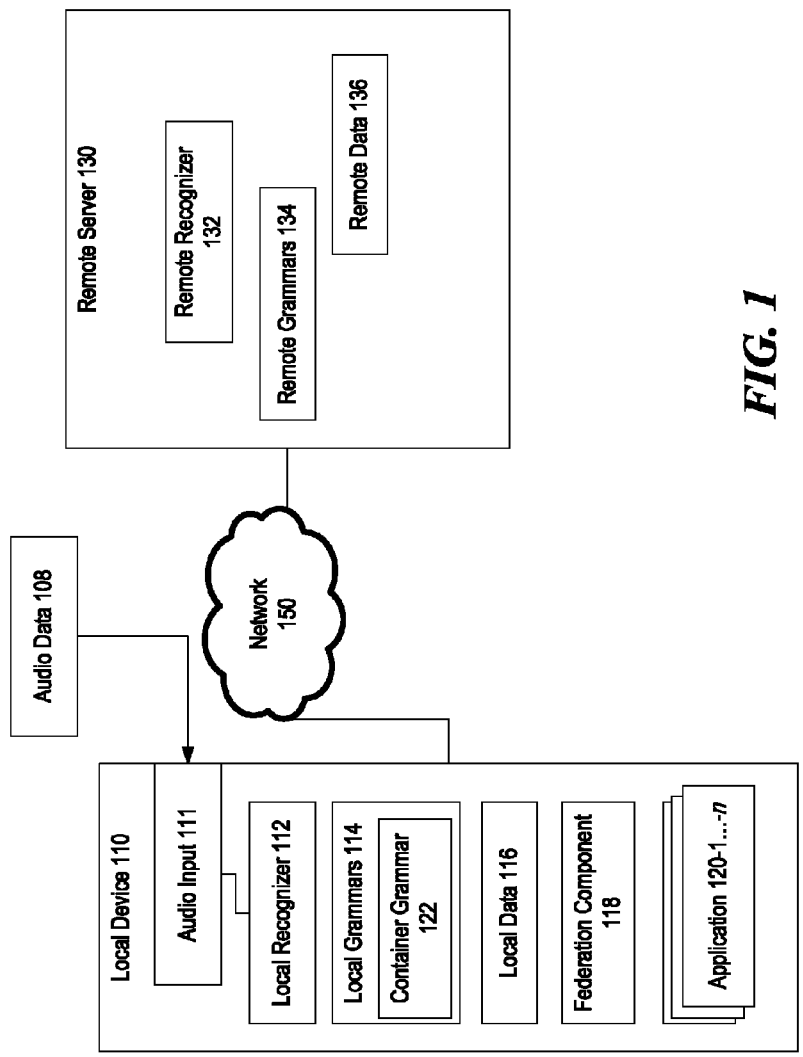
FIG. 1 illustrates an embodiment of a system for automated speech recognition.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to improved methods for speech recognition using local and remote resources substantially simultaneously. As discussed herein, "substantially simultaneously" is intended to refer to events that occur as close together in time as possible given the physical constraints on the system, without any intentional delay, although the events may not occur exactly in parallel. For example, the local recognizer may receive the audio data slightly before the remote recognizer, mainly due to transmission time differences, e.g. network latency, etc. Some systems may be designed to operate with various packet-based networks, such as the Internet or World Wide Web ("web"), to provide remote speech recognition services. Such implementations are sometimes referred to as automatic speech recognition (ASR) systems.

Embodiments may provide improved ASR by using local recognition resources in conjunction with remote recognition sources. A local device, such as a cell phone or portable digital assistant (PDA) may have a speech recognition engine (also referred to herein as a "recognizer") having its own grammars and local data, such as contact information. The local device may, for example, be able to recognize commands to locate a speech-specified contact and dial the telephone, e.g. "call Anne Smith." Other commands may require more resources. For example, a command to "find a dry cleaner within 5 miles" may require a grammar that is more complicated and access to more data. In this example, the local device may send the audio data to a remote recognizer on a network and await the result.

Embodiments may combine the use of local ASR resources with remote ASR resources by sending audio data substantially simultaneously to both local and remote ASR resources. When the grammar is relatively simple, and the data is local, the results from the local device may be sufficient, and may arrive faster than those from the remote device. When the grammar is more complex, or when the data is remote, the local device may wait for recognition results from both local and remote resources. The "best" recognition result may be automatically selected, or the operator may be presented with a choice of which result was meant. In this way, embodiments may achieve improved response times and accuracy of results.

FIG. 1 illustrates a block diagram for a system 100. System 100 may represent a general system architecture suitable for implementing various embodiments. System 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although system 100 as shown in FIG. 1 has a limited number of elements in a certain topology, it may be appreciated that system 100 may include more or less elements in alternate topologies as desired for a given implementation. The embodiments are not limited in this context.

In various embodiments, the system 100 may comprise, or form part of, a wired communications system, a wireless communications system, or a combination of both. For example, the system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, the system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Media information may sometimes be referred to as "media content" as well. Control information may refer to any data representing commands, instructions or control words meant for an automated system. For example, control information may be used to route media information through a system, to establish a connection between devices, instruct a device to process the media information in a predetermined manner, and so forth.

In various embodiments, system 100 may include a local device 110 and a remote server 130. The remote server 130 may comprise any logical or physical entity that is arranged to receive, process and complete a recognition task and application function requested by local device 110 over a network 150. Network 150 may comprise, for example, a packet-switched network, a circuit-switched network, or a combination of both. In various embodiments, the remote server 130 may comprise or be implemented as any processing or computing device, such as a computer, a server, a server array or server farm, a work station, a mini-computer, a main frame computer, a supercomputer, and so forth. The remote server 130 may comprise or implement a general or specific computing architecture suitable for communicating and processing virtual information. In one embodiment, for example, the remote server 130 may be implemented using a computing architecture as described with reference to FIG. 3.

Local device 110 may comprise any logical or physical entity that is arranged to receive audio data 108 at an audio input 111, pass the audio data 108 to a local recognizer 112 and the remote server 130. Local device 110 may be implemented as any device that includes, in its most basic form, a processing system including a processor and memory, one or more virtual input/output (I/O) components, and a wireless and/or wired network connection. Examples of virtual I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of local device 110 may include a telephone, a VoIP or VOP telephone, a packet telephone designed to operate on the PSTN, an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. In some implementations, local device 110 may be implemented using a general or specific computing architecture similar to the computing architecture described with reference to FIG. 3.

Local device 110 may comprise or implement one or more components operative to perform recognition tasks, and device tasks. The components may be designed to interoperate with components of remote server 130 to perform automatic speech recognition and tasks or functions indicated by the recognized result. For example, the local device 110 may comprise or implement the appropriate application programs and user interface controls to receive audio data 108, recognize speech from the audio data, send audio data to remote server 130, receive recognition results from remote server 130, select a recognition result from the local and remote recognition results, and perform a task or function indicated by the audio data. This may include an audio input 111 (e.g., video camera, microphone, etc.) to capture audio data 108 provided by the operator of the local device 110, output equipment (e.g., display, speaker, etc.), and transmission equipment to send and receive data.

Local recognizer 112 may be a component that is operative to recognize speech from audio data 108. Local recognizer may refer to one or more local grammars 114. Local grammars 114 may be relatively simple grammars, such as, but not limited to, a grammar that recognizes a command to call a locally-stored contact, or to launch a locally-installed application. For example, a local grammar for speech dialing may resemble "call <contact name>". A local grammar for a voice-driven application menu may resemble "start <application name>", or "play <song title>". Local grammars 114 may also contain container grammar 122 (also known as proxy grammars) to represent utterances that may ultimately need a remote recognizer. For example, a voice dial container grammar may resemble "call . . . " and may be needed if the contact is not a locally stored contact. A search container grammar may resemble "find . . . " or "search for . . . ". In the case using a container grammar, local recognizer 112 may only recognize the initial command, e.g. "call" or "find," while leaving the remainder of the utterance for the remote recognizer to recognize.

Local device 110 may also comprise local data 116, which may include, for example, but not limited to, local contact information, local documents, local music or video files, etc. Local data 116 may be used by local recognizer 112 in completing a recognition task. Local data 116 may also be used by local applications 120-1-n when performing a task or function.

Local device 110 may also comprise a federation component 118 that is operative to examine one or more recognition results and identify the most likely result. Federation component 118 may "listen" to several grammars and select the one that is most complete and/or has the highest degree of confidence in the result. Federation component 118 may also present a set of alternate results to the operator and allow the operator to select which result was meant.

Local applications 120-1-n may be any locally installed application on local device 110. Examples may include, but are not limited to, an e-mail application, a music player application, a word-processing application, a phone application, a contacts application, an internet browser, a search function, a calendar, a task list, etc. Each application 120 may have one or more grammars associated with the application that allow the operator to make use of the application via audio data. Applications 120 may use local data 116 or may need to access data over a network.

Local device 110 may communicate data with remote server 130 via network 150. Remote server 130 may comprise or implement one or more components operative to perform recognition tasks, and device tasks. The components may be designed to interoperate with components of local device 110 to perform automatic speech recognition and tasks or functions indicated by the recognized result.

Remote server 130 may include a remote recognizer 132 that is operative to receive transmitted audio data 108 and recognize the speech. Remote recognizer may use remote grammars 134 and remote data 136 in producing recognition results.

Remote grammars 134 may be more complex and/or more numerous compared to local grammars 114. For example, remote grammars 134 may include many permutations of a "find" grammar, such as, but not limited to, "find <business name>", "find <business type>", "find <building name>", etc. A more complex grammar may include, for example, "find <business type> within <distance> of <address>". The embodiments are not limited to these examples.

Remote data 136 may include any data not stored on local device 110. Remote data 136 may not necessarily be stored on the same device as remote recognizer 132 or remote grammars 134. Remote data 136 may include, for example, but not limited to, global contact information, geographical map data, search engine data, business directory listings, etc.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 2:
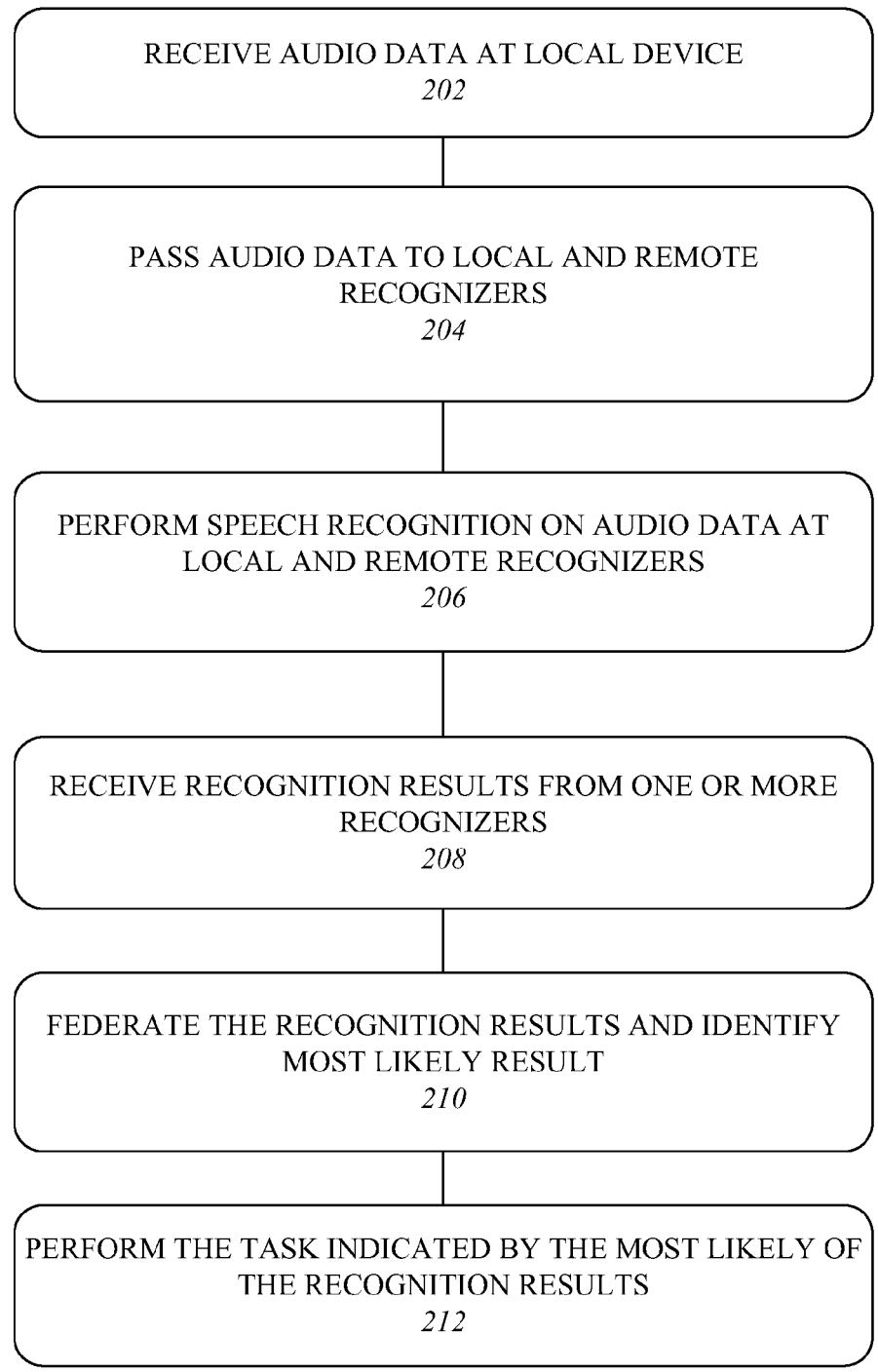
FIG. 2 illustrates an embodiment of a logic flow.

FIG. 2 illustrates one embodiment of a logic flow 200. Logic flow 200 may be representative of some or all of the operations executed by one or more embodiments described herein.

As shown in FIG. 2, the logic flow 200 may receive audio data at the local device in block 202. This may be referred to as "listening" to the audio data. In an embodiment, audio data may be spoken speech received through a microphone in, or in communication with, local device 110. In an embodiment, the operator may instruct the device to being receiving the audio data, for example, by pressing a button. In an embodiment, local device 110 may automatically detect the beginning of speech and may receive the audio data automatically. The audio data may be stored or buffered when received, at least until the recognition task is complete. Embodiments are not limited to this context.

In block 204, logic flow 200 may pass the audio data to a local recognizer and to a remote recognizer at substantially the same time. In an embodiment, the local recognizer may receive the audio data before the remote recognizer, mainly due to transmission time differences, e.g. network latency, etc. The local and remote recognizers may then begin their respective recognition activity substantially simultaneously. In an embodiment, the audio data may be passed while it is being received. In an embodiment, logic flow 200 may delay passing the audio data to the remote recognizer briefly to determine if the local recognizer can complete the recognition task locally. This may be useful in the event of limited or unavailable network bandwidth.

In block 206, the local and remote recognizers perform speech recognition on the audio data. Each recognizer may use its respective grammars and data to perform the recognition task. Local recognizer 112 may listen for both its local grammars 114 and container grammars 122. Remote recognizer 132 may listen for its remote grammars 134. The recognizers may produce one or more recognition results, and may assign or determine a confidence in the result.

In block 208, logic flow 200 may receive recognition results from one or more recognizers. The local recognizer may produce results first. If the local recognizer result is from a complete local grammar and is unambiguous, based on the recognized words and their confidence, then logic flow 200 may stop the remote recognition and move directly to block 212. In an embodiment, "unambiguous" may refer to a relatively high confidence score as compared to a threshold. The confidence score may indicate how likely a recognized result is to be correct, or a "best" guess. Similarly, even if the local recognizer is unable to recognize the speech, the remote recognizer may deliver a substantially complete and unambiguous result. In that case, the remote result may be used and the flow may move directly to block 212. Otherwise, logic flow 200 proceeds to block 210.

In block 210, logic flow 200 selects from, or federates, the received recognition results. In cases where there is one result, logic flow 200 may select that result, and move on to block 212. If there is no recognition result, the user may be prompted to speak again. If there are several recognition results, either from the local recognizer, remote recognizer, or both, the results may be federated. In federation, the recognition results are compared for completeness and confidence. If the results have similar confidence scores, or are otherwise similar, federation component 118 may present the one or more results to the operator and have the operator select which result was intended by the speech. If one result with a much higher confidence score than any other result, federating may select the result with the highest confidence score (or other measure). The selected result, if any, is referred to herein as a most likely result. The operator may select the intended speech, or cancel the action if the correct result does not appear.

In an embodiment (not shown), feedback from the operator's choice may be used to update and improve upon the recognition process. For example, the operator selection of a result may be submitted to the remote recognizer. The remote recognizer may use the selection and the associated audio data to improve a usage model and/or an acoustic model for the remote and/or local recognizers.

In block 212, logic flow 200 may perform the task indicated by the recognition result. For example, if the result is "Call John Smith at home," local device 110 may locate the contact information for John Smith from local data 116, identify the home telephone number, and may dial the phone. If the result is "Find an Italian Restaurant within one mile of Benson Hotel," then local device 110 may launch a search engine application and enter the search parameters. Embodiments are not limited to this context.

Figure 3:
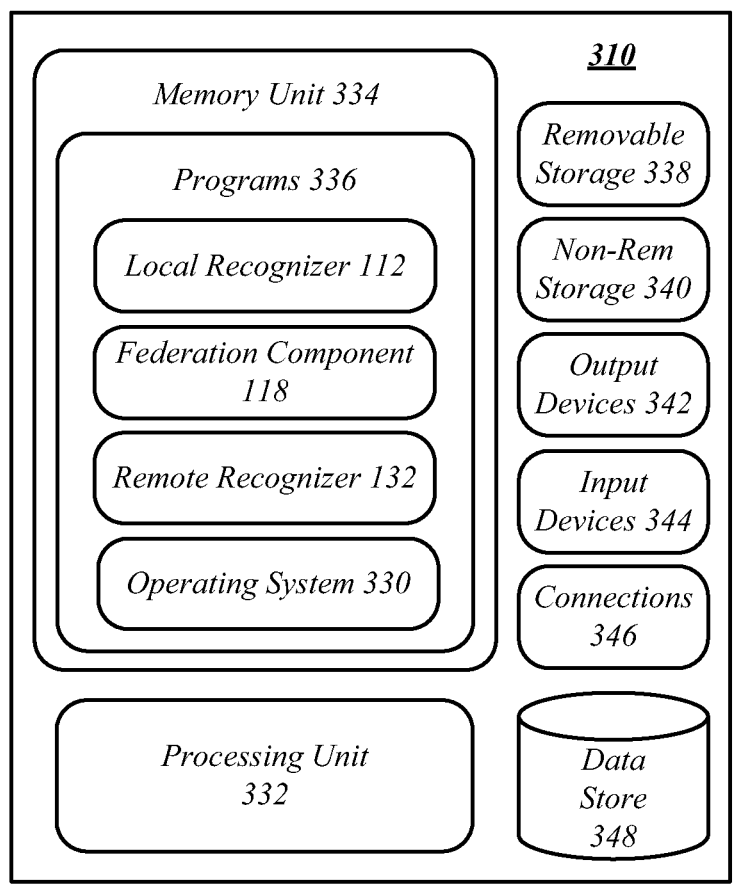
FIG. 3 illustrates an embodiment of a computing architecture.

FIG. 3 further illustrates a more detailed block diagram 300 of computing architecture 310 suitable for implementing a local device 110 or the remote server 130. In a basic configuration, computing architecture 310 typically includes at least one processing unit 332 and memory 334.

Memory 334 may be implemented using any machine-readable or computer-readable media capable of storing data, including both volatile and non-volatile memory. For example, memory 334 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 3, memory 334 may store various software programs, such as one or more application programs 336-1-$t$ and accompanying data. Depending on the implementation, examples of application programs 336-1-$t$ may include, but are not limited to, local recognizer 112, federation component 118, remote recognizer 132, operating system 330, and so forth.

Computing architecture 310 may also have additional features and/or functionality beyond its basic configuration. For example, computing architecture 310 may include removable storage 338 and non-removable storage 340, which may also comprise various types of machine-readable or computer-readable media as previously described. Computing architecture 310 may also have one or more input devices 344 such as a keyboard, mouse, pen, voice input device, touch input device, measurement devices, sensors, and so forth. Computing architecture 310 may also include one or more output devices 342, such as displays, speakers, printers, and so forth.

Computing architecture 310 may further include one or more communications connections 346 that allow computing architecture 310 to communicate with other devices. Communications connections 346 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Computing architecture 310 may further include data store 348, which may store data such as local data 116 or remote data 136. Data store 348 may be removable or non-removable storage.

Figure 4:
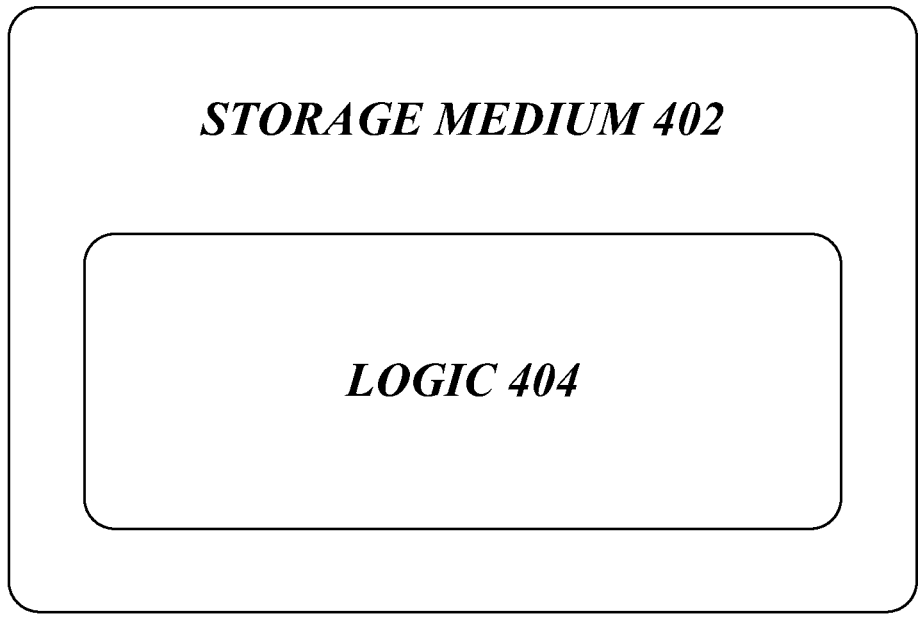
FIG. 4 illustrates an embodiment of an article.

FIG. 4 illustrates a diagram an article of manufacture 400 suitable for storing logic for the various embodiments, including the logic flow 200. As shown, the article of manufacture 400 may comprise a storage medium 402 to store logic 404. Examples of the storage medium 402 may include one or more types of computer-readable storage media capable of storing electronic data, including volatile memory or non-volatile memory, removable or non-removable memory, erasable or non-erasable memory, writeable or re-writeable memory, and so forth. Examples of the logic 404 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 400 and/or the computer-readable storage medium 402 may store logic 404 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a computer-readable storage device and containing instructions that if executed enable a computer to:
receive audio data indicating a task at a local device;
pass the audio data to a local recognizer on the local device;
perform speech recognition on the audio data with the local recognizer;
based upon network bandwidth, delay passing the audio data to the remote recognizer until it is determined that the local recognizer cannot complete the speech recognition;
receive a recognition result from at least one of the local and the remote recognizers; and
perform the task indicated by the recognition result.

2. The article of claim 1, further comprising instructions that if executed enable the computer to:
federate the recognition results to produce a most likely result; and
perform the task indicated by the most likely result.

3. The article of claim 2, further comprising instructions that if executed enable the computer to:
display at least one recognition result; and
receive an operator selection of the most likely result from the displayed recognition result.

4. The article of claim 3, further comprising instructions that if executed enable the computer to provide feedback to at least one of the local and remote recognizers in response to the operator selection and to update at least one of a usage model or an acoustic model for at least one of the local or the remote recognizer based on the feedback.

5. The article of claim 1, further comprising instructions that if executed enable the computer to pass the audio data to both the local recognizer and the remote recognizer substantially simultaneously.

6. The article of claim 1, further comprising instructions that if executed enable the computer to stop passing audio to the remote recognizer when the local recognizer produces a substantially unambiguous result.

7. A computer-implemented method, comprising:
receiving audio data indicating a task at a local device;
passing the audio data to a local recognizer on the local device;
recognizing speech from the audio data with the local recognizer;
in response to limited or unavailable network bandwidth, delaying passing the audio data to a remote recognizer it is determined that the local recognizer cannot complete the speech recognition;
receiving a recognition result from at least one of the local and the remote recognizers; and
displaying the recognition result.

8. The method of claim 7, comprising:
federating the recognition results to produce a most likely result; and
performing the task indicated by the most likely result.

9. The method of claim 8, comprising:
displaying a plurality of recognition results; and
receiving an operator selection of the most likely result from the displayed recognition results.

10. The method of claim 9, comprising:
providing feedback to at least one of the local and remote recognizers in response to the operator selection; and
updating at least one of a usage model or an acoustic model for at least one of the local or the remote recognizer based on the feedback.

11. The method of claim 7, comprising:
passing the audio data to both the local recognizer and the remote recognizer substantially simultaneously.

12. The method of claim 7, comprising:
stopping the passing of audio data to the remote recognizer when the local recognizer produces a substantially unambiguous result.

13. An apparatus, comprising:
an audio input operative to receive audio data indicating a task;
a local recognizer component to receive the audio data, to recognize speech from the audio data, to pass the audio data to both a local recognizer and a remote recognizer substantially simultaneously;

in response to limited or unavailable network bandwidth, delay passing the audio data to the remote recognizer it is determined that the local recognizer cannot complete the speech recognition;

a federation component operative to receive one or more recognition results from at least one of the local and the remote recognizers and to federate a plurality of recognition results to produce a most likely result; and an application to perform the task indicated by the most likely result as indicated by the federation component.

14. The apparatus of claim 13, further comprising a display, and wherein the federation component is operative to display at least one recognition result, and to receive an operator selection of the most likely result from the displayed recognition result.

15. The apparatus of claim 14, the federation component operative to provide feedback to at least one of the local and remote recognizers in response to the operator selection.

16. The apparatus of claim 15, comprising:

updating at least one of a usage model or an acoustic model for at least one of the local or the remote recognizer based on the feedback.

17. The apparatus of claim 13, further comprising:

a local grammar operative to be used by the local recognizer to complete a recognition task at the apparatus; and a container grammar operative to be used by the local recognizer to partially complete a recognition task at the apparatus.

18. The apparatus of claim 17, wherein when a recognition task is not complete according to the local grammar and is partially complete according to the container grammar, the federation component waits for a recognition result from the remote recognizer.

* * * * *